(12) United States Patent
Xi et al.

(10) Patent No.: US 9,203,640 B2
(45) Date of Patent: Dec. 1, 2015

(54) LONG DISTANCE SUBSEA CAN BUS REPEATER CABLE

(71) Applicants: Huijiang Xi, Maitland, FL (US);
Michael C. Greene, Palm Bay, FL (US);
Alan McCleary, St. Augustine, FL (US)

(72) Inventors: Huijiang Xi, Maitland, FL (US);
Michael C. Greene, Palm Bay, FL (US);
Alan McCleary, St. Augustine, FL (US)

(73) Assignee: Teledyne Instruments, Inc., Thousand Oaks, CA (US)

(*) Notice: Subject to any disclaimer, the term of this patent is extended or adjusted under 35 U.S.C. 154(b) by 0 days.

(21) Appl. No.: 14/294,575

(22) Filed: Jun. 3, 2014

(65) Prior Publication Data

US 2014/0376599 A1 Dec. 25, 2014

Related U.S. Application Data

(60) Provisional application No. 61/831,031, filed on Jun. 4, 2013.

(51) Int. Cl.
| | |
|---|---|
| *H04B 3/36* | (2006.01) |
| *H04B 7/17* | (2006.01) |
| *H04B 17/02* | (2006.01) |
| *H04L 25/00* | (2006.01) |
| *H04L 25/52* | (2006.01) |
| *H04L 12/40* | (2006.01) |
| *H04L 12/413* | (2006.01) |
| *H04L 12/46* | (2006.01) |

(52) U.S. Cl.
CPC .......... *H04L 12/40* (2013.01); *H04L 12/40006* (2013.01); *H04L 12/40045* (2013.01); *H04L 12/40091* (2013.01); *H04L 12/4135* (2013.01); *H04L 12/4625* (2013.01); *H04L 2012/40215* (2013.01)

(58) Field of Classification Search
CPC .............. H04L 12/40; H04L 12/40091; H04L 12/4135; H04L 25/20; H04L 12/44; H04L 12/46; H04L 12/40006; H04L 12/40045; H04L 12/4625; H04L 2012/40215; H04B 3/36; H04B 7/15542; H04B 7/2606; H04B 7/155; H04W 88/04; H04W 16/26
USPC .................. 375/211, 214, 219; 379/348, 400; 710/110; 370/315, 327
See application file for complete search history.

(56) References Cited

U.S. PATENT DOCUMENTS

| | | | | |
|---|---|---|---|---|
| 3,676,613 | A * | 7/1972 | Brewer .................. | 379/348 |
| 4,054,941 | A * | 10/1977 | Shichman ............... | 379/400 |
| 7,793,022 | B2 * | 9/2010 | Travers et al. .......... | 710/110 |

* cited by examiner

*Primary Examiner* — Phuong Phu
(74) *Attorney, Agent, or Firm* — Valenti, Hanley & Robinson, PLLC; Kevin T. Duncan

(57) ABSTRACT

Messages on controller area network (CAN) buses are communicated over subsea links. Repeaters couple CAN buses to each end of a subsea link. The subsea link may be, for example, a twisted pair or a single wire with a sea ground. The repeater detects a direction of transmission, that is, whether a signal began on the CAN bus coupled to the repeater or on the subsea link coupled to the repeater. Signals from the CAN bus are conditionally transmitted to the subsea link depending on the detected direction of transmission. Signals from the subsea link are conditionally transmitted to the CAN bus depending on the detected direction of transmission. The repeater can operate at the physical layer without analyzing contents of the CAN bus communications.

10 Claims, 6 Drawing Sheets

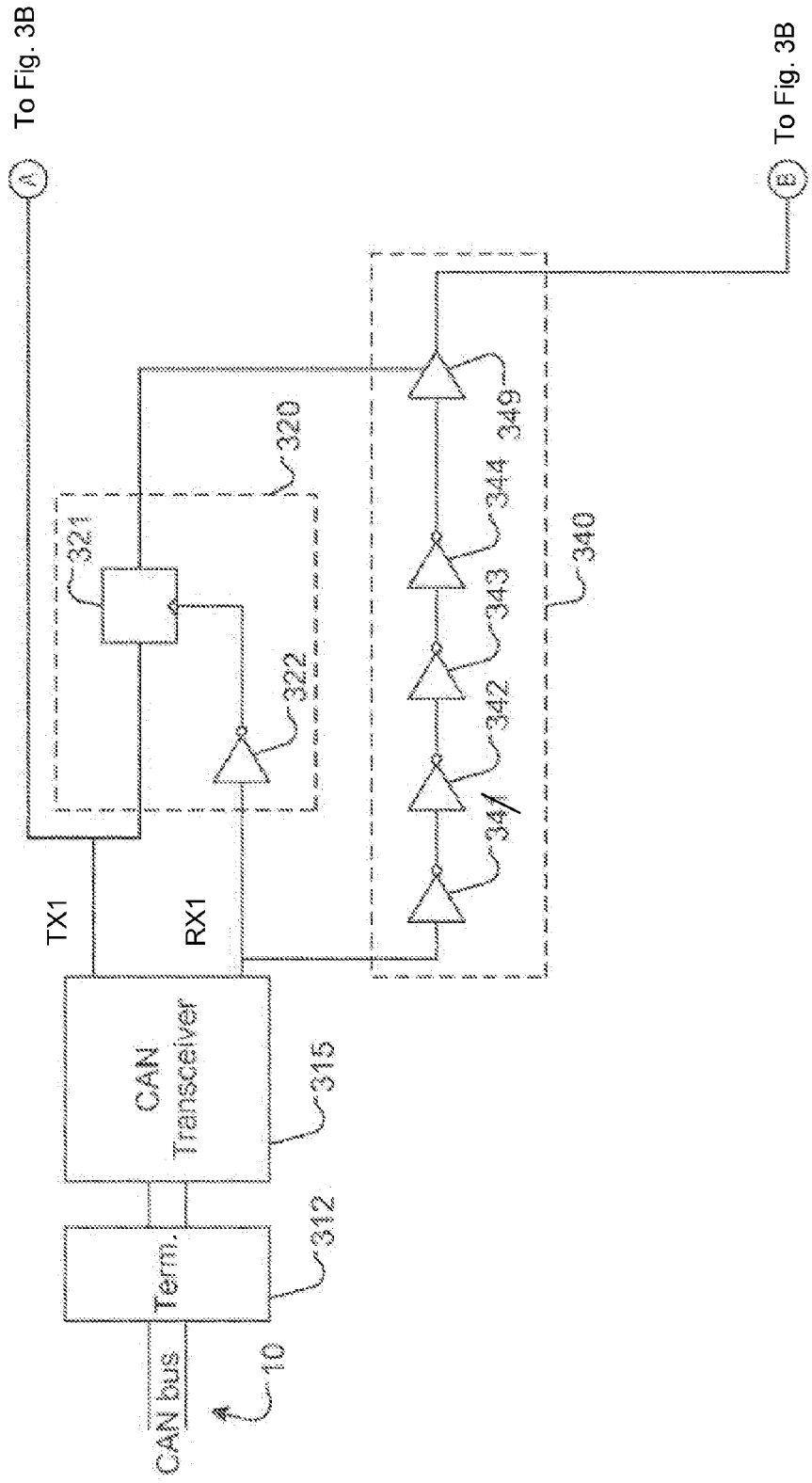

LONG DISTANCE SUBSEA CAN BUS REPEATER CABLE

CROSS REFERENCE TO RELATED APPLICATION

The present application claims benefit of priority to and is a continuation-in-part of U.S. Prov. Pat. Application Ser. No. 61/831,031, filed Jun. 4, 2013, and entitled LONG DISTANCE SUBSEA CAN BUS REPEATER CABLE (Xi et. al.), which is hereby incorporated by reference herein in its entirety.

FIELD OF THE INVENTION

The present invention relates to the field of communication buses and, in particular, to systems and methods for extending controller area network buses for long-distance subsea communication.

BACKGROUND

Subsea systems, such as those used in exploration and production of oil and gas, continue to increase in complexity. A subsea well can include sensors and actuators located at or below the sea floor. The sensors can be, for example, pressure sensors, temperature sensors, and erosion detectors. The actuators can be, for example, valves, pumps, and other flow control devices. Information from the sensors is commonly processed by equipment at a surface facility. Similarly, controls for the actuators commonly originate at a surface facility. Accordingly, communication is needed between the subsea devices and equipment at the surface.

Controller area network (CAN) buses are used to interconnect sensors, actuators, controllers, and other devices in applications such as automobiles, industrial automation, and medical equipment. Many circuits and devices have been developed for CAN bus communications. However, current CAN bus based subsea systems face several limitations. Network size is restricted due to the impedance drop that results from connecting multiple electrical devices in parallel. Additionally, conventional driver components may not be suitable for long transmission lines.

There are many types of connectors for making electrical and fiber-optic cable connections in hostile or harsh environments, such as underwater or subsea electrical, optical and hybrid electrical and optical connectors which can be repeatedly mated and demated underwater at great ocean depths. The connectors may be electrical only, optical only, or may be hybrid electrical and optical connectors. These connectors typically consist of releasably mateable plug and receptacle units or connector parts, each attached to cables or other devices intended to be joined by the connectors to form completed circuits. Each connector unit contains one or more electrical and/or optical contacts or junctions for engagement with the junctions in the other unit when the two units are mated together. To completely isolate the contacts to be joined from the ambient environment, one or both parts of these connectors house the contacts in oil-filled, pressure-balanced chambers.

The contacts on one side of a subsea or wet mateable electrical connector are typically in the form of pins or probes, while the contacts or junctions on the other side are in the form of sockets for receiving the probes. Typically, the socket contacts are contained in a sealed chamber containing a dielectric fluid or other mobile substance, and the probes enter the chamber via one or more sealed openings which include seals which exclude seawater and/or contaminants from the contact chamber in the mated and unmated conditions. Such electrical connectors are generally known as pin-and-socket type connectors. One example of an electrical underwater pin and socket connector is described in U.S. Pat. No. 5,645,442 of Cairns and is sold by Teledyne ODI, Inc. of Daytona Beach, Fla. under the name Nautilus®.

SUMMARY

Systems and methods for communicating controller area network buses via subsea links are provided. In one aspect, the invention provides a device for adapting controller area network (CAN) bus communication over a single wire link. The single wire link can be used with a sea ground. In another aspect, the invention provides a device for adapting controller area network (CAN) bus communication over a long-distance twisted pair link. The twisted pair link may use a high-speed CAN bus that uses low voltage signaling.

The repeaters address impediments that arise in using CAN buses subsea. Controller Area Network bus or CAN bus was originally designed for use in automotive sensor applications. The range over which these signals are transmitted are typically short, on the order of several meters. It has been widely adopted for use in industrial control applications, where the signal path lengths are longer, but still within the capability of the CAN bus hardware and architecture. It is now used in undersea oil and gas fields for data transmission and control, where the lengths of signal cable are increasing with the size of the field. The increased lengths reach limitations inherent in conventional CAN bus systems.

In order to increase the distance and number of sensors in one CAN bus system, CAN bus signal repeaters can be used. One impediment to using CAN bus repeaters is the phenomenon of "Closed Loop Lock." This arises because the CAN bus transceiver is bidirectional by design. It uses the same physical medium for both transmission and reception of signals. The transceiver will interpret its own transmitted signal at the cable terminals as an incoming data signal to be received and decoded. Thus, it is the feature of a CAN bus transceiver that any input signal will appear at its output after a time delay. This feature causes the dead closed loop effect by re-transmitting its own signal forever if a repeater simply repeats the CAN bus signal. This signal confusion results in the closed loop lock and loss of communication. The disclosed CAN bus repeaters use a special logic circuit to break the closed loop lock phenomenon and allow signals to be transmitted in the directions intended.

Another impediment is driving signals over long distances. Standard CAN bus systems share two features: high differential voltage (about 8 volts) and low data rate (50 kHz). The capacitance of differential pair links may slow down signal transitions. The higher the voltage is, the longer the transition time will be. Therefore, a standard CAN bus cannot transmit long distances with differential wire cable.

Two techniques are provided to communicate over long distances: 1) reduce the transmission line capacitance, or 2) reduce the CAN bus differential voltage.

The first technique uses an unbalanced line with an unpaired conductor and uses the ocean or earth as a signal ground. This substantially eliminates the twisted pair capacitance load. Signals can then be transmitted, for example, hundreds of meters without significant dispersion.

The second technique uses high speed CAN bus drivers with long distance (e.g., about 1000 meters) twisted pair between two CAN bus repeaters. A high speed CAN bus driver uses a low differential voltage (e.g., less than 2 volts) so the signal transition time is much less than with a standard CAN bus. Use of high speed CAN bus drivers in applications with low data speed, gains transmission distance. High speed CAN bus can be used only between CAN bus repeaters with the other connections to the repeater being standard subsea CAN buses.

In one embodiment the invention provides a repeater device for providing controller area network (CAN) bus communication over a single wire link to extend the communication range of controller area network (CAN) buses. The repeater device includes: a first CAN transceiver coupled to a CAN bus, configured to sense levels on the CAN bus and supply a first receive signal indicating the sensed levels, and configured to receive a first transmit signal and drive a corresponding level on the CAN bus; a second CAN transceiver coupled to a single wire link, configured to supply a second receive signal that signals the level on the single wire link, and configured to receive a second transmit signal and drive a corresponding level on the single wire link; logic circuitry coupled to the first and second CAN transceivers and configured to break closed lock loop between first and second CAN transceivers; and a DC-DC converter configured to generate an internal low voltage supply derived from an external high voltage input, the internal ground floating from the external ground. In addition, the single wire link may interconnect the repeater device with a second repeater device connected to a second CAN bus. For both the first and second repeater devices the external ground is either ocean or earth ground, and the single wire link provides an unbalanced line with an unpaired conductor that substantially eliminates capacitance load and extends signal transmission range. In addition, the logic circuitry may include: direction detection circuitry configured to determine whether a signal is being transmitted from the CAN bus to the single wire link or from the single wire link to the CAN bus; and transmit-enable circuitry configured to supply a transmit signal based at least in part on the direction detection circuitry determination. The first CAN transceiver communicates over the CAN bus using a differential voltage of about eight volts and a data rate of about 50 Hz. For receive and transmit signals a low level corresponds to a logic 0 or dominant level and a high level corresponds to a logic 1 or recessive level. Upon detecting a persistent dominant state the first CAN transceiver disables driving the CAN bus. The internal low voltage supply generated by the DC-DC converter is approximately a 5-volt supply.

In a second embodiment the invention provides a system for coupling controller area network (CAN) buses via a single wire link within a transmission line, the system having first and second repeater devices. The second repeater device is connected to the first repeater device via the single wire link and is connected to a second CAN bus. The first and second repeater devices connected via the single wire link provide low overall transmission line capacitance. The external ground is either an ocean or an earth ground and the single wire link provides an unbalanced line with an unpaired conductor that substantially eliminates capacitance load and extends signal transmission range of the first and second CAN buses.

In a third embodiment the invention provides a repeater device for providing CAN bus communication over a twisted pair wire cable to extend the communication range of CAN buses. The repeater device comprises: a standard CAN transceiver coupled to a CAN bus, configured to sense levels on the CAN bus and supply a first receive signal indicating the sensed levels, and configured to receive a first transmit signal and drive a corresponding level on the CAN bus; a high speed CAN transceiver coupled to an twisted pair, configured to supply a second receive signal that signals the level on the twisted pair, and configured to receive a second transmit signal and drive a corresponding level on the twisted pair, the high speed CAN transceiver configured to provide low-voltage signaling via the twisted pair; and logic circuitry coupled to the first and second CAN transceivers and configured to break closed lock loop between first and second CAN transceivers. An inter-bus twisted pair link interconnects the high speed CAN transceiver of the first repeater device with a high speed CAN transceiver of a second repeater device. The second repeater device is connected to a second CAN bus, wherein both the high speed CAN bus transceivers of the first and second repeater devices use low differential voltage for communicating on the inter-bus twisted pair to substantially decrease signal transition time and enable extended signal transmission range. In addition, the low differential voltage is less than 2 volts and the standard CAN transceiver communicates over the CAN bus using a differential voltage of about 8 volts and a data rate of about 50 Hz. For receive and transmit signals a low level corresponds to a logic 0 or dominant level and a high level corresponds to a logic 1 or recessive level. Upon detecting a persistent dominant state the first CAN transceiver disables driving the first CAN bus.

In a fourth embodiment the invention provides A system for coupling controller area network (CAN) buses via a twisted pair wire cable within a transmission line to extend the communication range of controller area network (CAN) buses. The system includes first and second repeater devices. The first repeater device comprising: a standard CAN transceiver coupled to a CAN bus, configured to sense levels on the CAN bus and supply a first receive signal indicating the sensed levels, and configured to receive a first transmit signal and drive a corresponding level on the CAN bus; a high speed CAN transceiver coupled to an inter-bus twisted pair, configured to supply a second receive signal that signals the level on the inter-bus twisted pair, and configured to receive a second transmit signal and drive a corresponding level on the inter-bus twisted pair, the high speed CAN transceiver configured to provide low differential voltage signaling via the inter-bus twisted pair; and logic circuitry coupled to the first and second CAN transceivers and configured to break closed lock loop between first and second CAN transceivers. The second repeater device is connected to the first repeater device via the inter-bus twisted pair and is connected to a second CAN bus, whereby the first and second repeater devices connected via the inter-bus twisted pair using low differential voltage provide faster signal transition. The inter-bus twisted pair link interconnects the high speed CAN transceiver of the first repeater device with a high speed CAN transceiver of a second repeater device, the second repeater device being connected to a second CAN bus, wherein both the high speed CAN bus transceivers of the first and second repeater devices use low differential voltage for communicating on the inter-bus twisted pair to substantially decrease signal transition time and enable extended signal transmission range.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3A is a block diagram illustrating further aspects of the repeater of FIG. 2;

DETAILED DESCRIPTION

Figure 1:
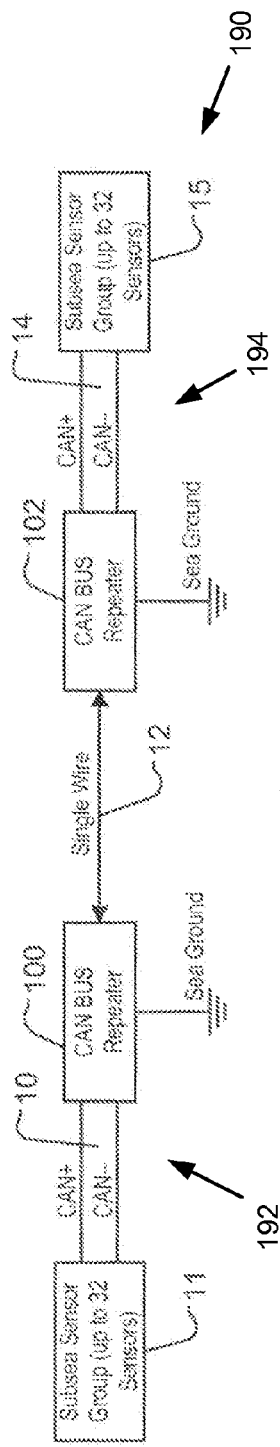
FIG. 1 is a block diagram of a controller area network that includes a communication link using a single wire.

FIG. 1 is a block diagram of a first exemplary controller 190 area network that includes a communication link using a single wire. The controller area network (CAN) includes two bus groups 192, 194. A first bus group 192 includes a first group of subsea sensors 11 and a first CAN bus repeater 100. A second bus group includes a second group of subsea sensors 15 and a second CAN bus repeater 102.

The first group of subsea sensors 11 and the first CAN bus repeater e coupled to a first CAN bus 10 that serves as a communication medium for the first bus group 192. The second group of subsea sensors 15 and the second CAN bus repeater 102 are coupled to a second CAN bus 14 that serves as a communication medium for the second bus group 194.

Data are transmitted on the CAN bus as a sequence of binary pulses. The binary pulses are received by all of the CAN devices connected to the CAN bus including the transmitting one of the CAN devices. In the CAN bus protocol, messages are transmitted in standard formats. The messages may include an identifier of the associated device, message data, and various control fields. The messages can vary in length and may include more than ts.

Each CAN bus commonly uses a differential pair of signal wires. The signal wires are termed a high signal "CANH" (or "CAN+") and a low signal "CANL" (or "CAN−"). The CAN protocol designates a logic 0 as a "dominant" signal and a logic 1 as a "recessive" signal. Recessive signals are represented by a lower voltage on the CANH signal and a higher voltage on the CANL signal. Dominant signals are represented by a higher voltage on the CANH signal and a lower voltage on the CANL signal. Other signal representations may be used. The electrical characteristics of transmitters coupled to a CAN bus are such that if a dominant signal is transmitted from any transmitter, a dominant signal appears on the bus. This occurs even if other transmitters are transmitting recessive signals. This may also be viewed as the transmitters only transmitting the dominant signal with the default state of the CAN bus being recessive.

When one of the CAN devices can initiate communication with other CAN devices, the initiating device may be considered a master and the other devices considered slaves. In some embodiments, the controller area network has a single master CAN device.

The first group of subsea sensors 11 and the second group of subsea sensors 15 are coupled via the first CAN bus repeater and the second CAN bus repeater 102. The first CAN bus repeater and the second CAN bus repeater 102 are coupled via an inter-bus link 12. In the embodiment of FIG. 1, the inter-bus link 12 uses a single wire. A sea ground provides a reference for the inter-bus link 12. Alternatively, an earth ground may be used.

The repeaters 100,102 couple the CAN buses 10, 14 to the inter-bus link 12. The repeaters transmit sequences of binary pulses received from the CAN buses to the inter-bus link and transmit sequences of binary pulses received from the inter-bus link to the CAN buses. A pair of the repeaters, one at each end of one of the inter-bus link can thus couple two of the CAN buses. Each of the repeaters may be the same or similar.

The repeaters provide bidirectional communication so that information can be communicated between the bus groups in either direction. Additionally, in one embodiment, there may be more than two bus groups that are coupled by additional repeaters. Examples of such controller area networks are described in U.S. patent application Ser. No. 13/551,346, filed Jul. 17, 2012, which is incorporated herein by reference in its entirety.

The inter-bus link 12 and the repeaters 100,102 may allow the CAN buses and the CAN devices in the first and second bus groups to be separated by large distances, for example, several kilometers. The repeaters can be used to provide electrical isolation between the CAN buses. The repeaters can also be used to couple CAN buses with incompatible electrical characteristics. The use of bus groups interconnected through repeaters may also allow a larger number of CAN devices to communicate, for example, by avoiding low impedances caused by a large number parallel connected devices.

The repeaters 100,102 break circular traffic that could block communication in the network. The repeaters 100,102 only transmit dominant signals to the inter-bus link when the dominant signals are first received from the local CAN bus. Dominant signals that are first received from the inter-bus link and then appear on the local CAN bus are not retransmitted to the inter-bus link.

The repeaters transmit pulses between the associated CAN bus and inter-bus link pulse by pulse. That is, each pulse is transmitted when it is received without analyzing subsequent pulses to determine whether to transmit the pulse.

Although the controller area network is illustrated in FIG. 1 with a particular number of bus groups and a particular combination of CAN devices, other embodiments may have a different number of bus groups and a different combination of CAN devices. Additionally, to enable a concise description, this disclosure uses the terminology of the CAN bus protocol, for example, as described in the ISO 11898 series of standards. The devices, methods, and techniques described are also applicable to other protocols.

Figure 2:
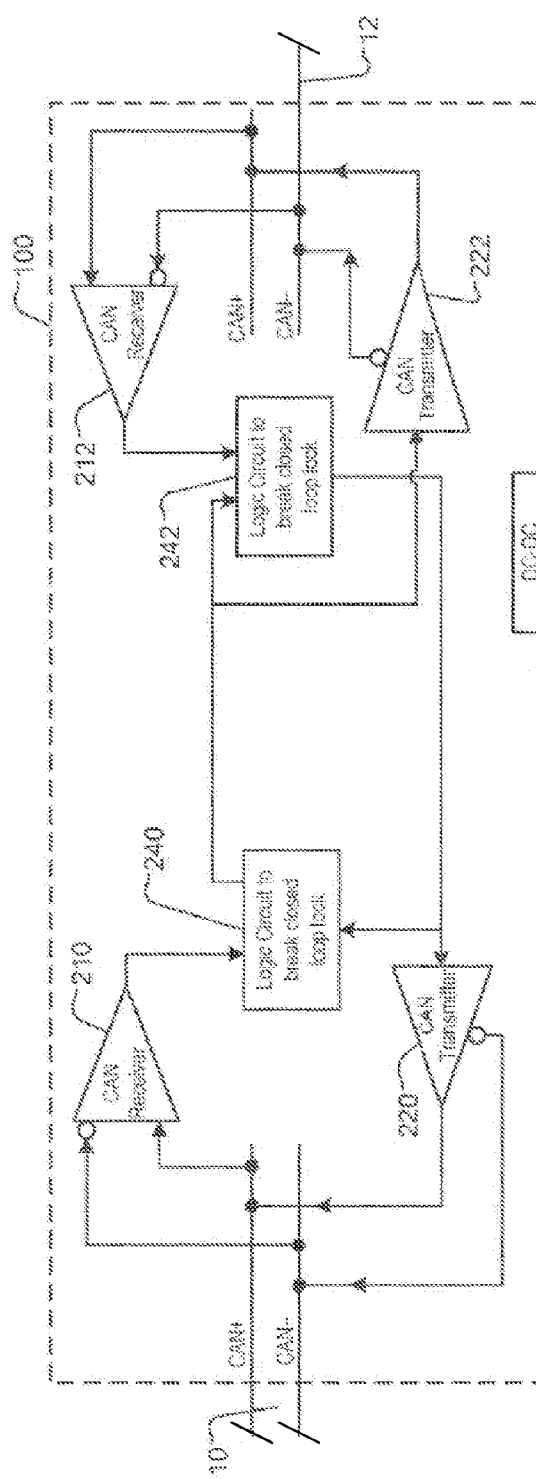
FIG. 2 is a block diagram of a repeater that can be used in the controller area network of FIG. 1.

FIG. 2 is a block diagram of a repeater that can be used in the controller area network of FIG. 1. The repeater 100 transmits signals received from a single wire link 12 to a CAN bus 10. The repeater also transmits signals from the CAN bus 10 to the single wire link 12.

The repeater of FIG. 2 may be used as one of the repeaters 100,102 of the controller area network described with reference to FIG. 1. For example, when the repeater is used as the first repeater 100 the controller area network of FIG. 1, the CAN bus 10 corresponds to the first CAN bus 10 and the single wire link 12 corresponds to the inter-bus link 12.

The repeater includes a first CAN receiver 210 and a first CAN transmitter 220. The first CAN receiver 210 and the first CAN transmitter 220 are coupled to the CAN bus 10. The coupling may be via a coupling network, for example, a network of resistors and capacitors for impedance matching. The first CAN receiver 210 and a first CAN transmitter 220 may be provided by an integrated circuit, for example, a TJA1 054A from NXP Semiconductors. The first CAN receiver 210 and a first CAN transmitter 220 are coupled to a first logic circuit 240 that operates to break closed loop lock.

The repeater also includes a second CAN receiver 212 and a second CAN transmitter 222. The second CAN receiver 212 and the second CAN transmitter 222 are coupled to the single wire link 12. The coupling may be via a coupling network, for example, a network of resistors and capacitors for impedance matching. The second CAN receiver 212 and a second CAN transmitter 222 are coupled to a second logic circuit 242 that also operates to break closed loop lock.

The logic circuits that operate to break closed loop lock allow signals to be communicated between the CAN bus 10 and the single wire link 12 without dominant signals becoming looked in a loop between the CAN receivers and CAN transmitters.

Figure 3B:
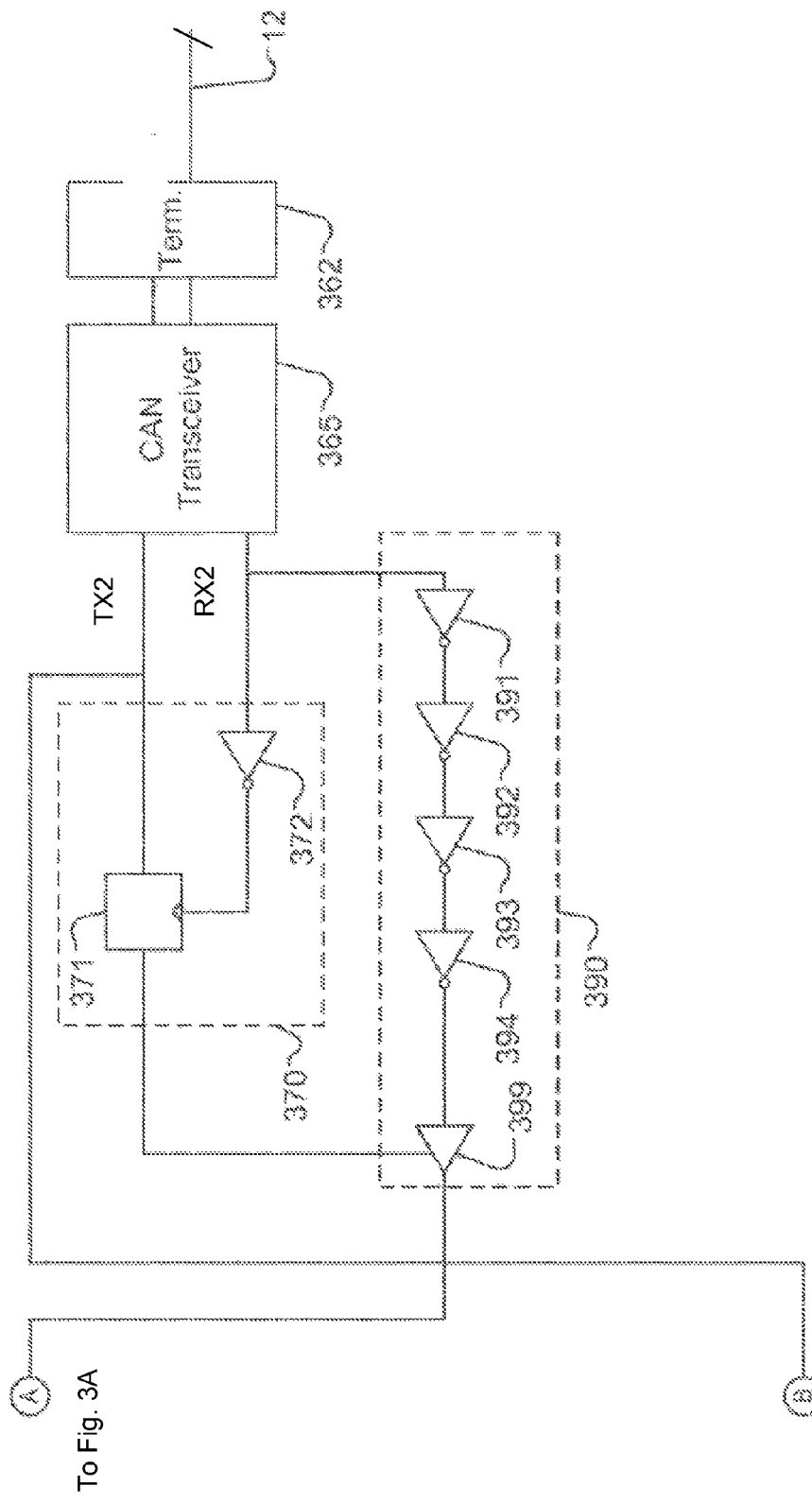
FIG. 3B is a block diagram illustrating further aspects of the repeater of FIG. 2.

FIGS. 3A and 3B are block diagrams illustrating further aspects of the repeater 100 of FIG. 2. The repeater operates in substantially the same manner as the repeater of FIG. 2. The repeater of FIG. 3A/B transmits signals received from a single wire link 12 to a CAN bus 10 and from the CAN bus 10 to the single wire link 12. The repeater may be used as one of the repeaters 100, 102 of the controller area network described with reference to FIG. 1.

The repeater 100 includes a first CAN transceiver 315. The first CAN transceiver 315 IS coupled to the CAN bus 10 via a coupling network 312. The coupling network 312 may be a network of resistors and capacitors arranged for impedance matching. The first CAN transceiver 315 supplies a first receive signal RX1 that signals the level on the CAN bus 10. The first CAN transceiver 315 receives a first transmit signal TX1 and drives a corresponding level on the CAN bus 10. In the illustrated embodiment, on the receive and transmit signals, a low level corresponds to a logic 0 or dominant level and a high level corresponds to a logic 1 or recessive level.

The first CAN transceiver 315 may include additional functions, such as fault detection and various power states. For example, a CAN transceiver may detect a persistent dominant state and then disable driving the CAN bus. This may be useful for initialization, or for recovering from an erroneous state caused, for example, by a noise transient. In some embodiments, a persistent dominant state is detected by other blocks of the repeater.

As shown in FIG. 3B, the repeater also includes a second CAN transceiver 365. The second CAN transceiver 365 is coupled to the single wire link 12 via a coupling network 362. The second CAN transceiver 365 supplies a second receive signal RX2 that signals the level on the single wire link 12. The second CAN transceiver 365 receives a second transmit signal TX2 and drives a corresponding level on the single wire link 12. In the illustrated embodiment, the CAN− signal from the second CAN transceiver 365 is coupled the single wire link 12 and the CAN+ signal is not coupled outside the repeater. Other signaling arrangements may also be used.

As shown in FIG. 2, the repeater, in an embodiment, includes an isolated DC-DC converter 250. The DC-DC converter 250, for example, can generate a 5-volt supply (relative to a ground reference) for use by the circuitry of the repeater. The DC-DC converter 250 generates the supply from an outside high voltage input. Due, for example, to an isolation transformer, the output ground (referred to as GND) of the DC-DC converter 250 is floating from the input ground of the DC-DC converter 250. GND of the two repeaters at each end of the single wire link 12 may be coupled to sea ground. In this case, both repeaters will have a common reference point but will not confuse other signal grounds in the system.

The first CAN transceiver 315 and the second CAN transceiver 365 are coupled via a first transmit enable module 340, a first direction detection module 320, a second transmit enable module 390, and a second direction detection module 370. The first transmit enable module 340, the first direction detection module 320, the second transmit enable module 390, and the second direction detection module 370 operate to avoid closed loop lock between the CAN bus 10 and the single wire link 12.

The first transmit enable module 340 includes a series of inverters 341-344 and a first transmit enable buffer 349. The first transmit enable buffer 349 has an output signal that supplies a signal to the second transceiver 365 to be transmitted on the single wire link 12. The first transmit enable buffer 349 is a tristate buffer that is enabled by a first direction detection signal from a first direction detection flip-flop 321. The first transmit enable buffer 349 receives a data input from a fourth transmit enable inverter 344 that is connected in series with a third transmit enable inverter 343 that is connected in series with a second transmit enable inverter 342 that is connected in series with a first transmit enable inverter 341. The first transmit enable inverter 341 receives as its input the first receive signal RX1 from the first CAN transceiver 315.

When disabled, the output of the first transmit enable buffer 349 may be pulled high by a pullup in the first transceiver (or another resistor). When enabled, the output of the first transmit enable buffer 349 matches the first receive signal RX1 from the first CAN transceiver 315 (albeit delayed). The delay provided by the transmit enable inverters is used to match circuit delays incurred to produce the direction detection signal. Thus, the delay provided by the transmit enable inverters does not need to be adjusted for different data rates. Since the delay is used to match the delay of other digital circuits, the delay can be provided without the use of an analog circuit, which could be difficult to implement.

The first direction detection module 320 in the embodiment of FIG. 3A includes the first direction detection flip-flop 321 that is used in determining whether a signal is being transmitted from the CAN bus 10 to the single wire link 12 or from the single wire link 12 to the CAN bus 10. The first direction detection flip-flop 321 receives as a data input the first transmit signal TX1, which is the supplied by a second transmit enable module 390 of FIG. 3B. The first direction detection flip-flop 321 latches its data input triggered by rising edges of a clock input to the first direction detection flip-flop 321. The clock input is an inverted version of the first receive signal RX1 from the first CAN transceiver 315 supplied from a first direction detection inverter 322. The first direction detection flip-flop 321 supplies its data output to the first transmit enable buffer 349 as the first direction detection signal.

The first direction detection signal is high and the first transmit enable buffer 349 is enabled when the first direction detection flip-flop 321 stores a high signal. The first direction detection signal is low and the first transmit enable buffer 349 is disabled when the first direction detection flip-flop 321 stores a low signal. Since the first direction detection flip-flop 321 stores the state of the first transmit signal TX1 at falling edges of the first receive signal RX1, the first transmit enable buffer 349 is enabled when the first transmit signal TX1 is high (recessive) when the first receive signal RXI falls (recessive to dominant transition). Conversely, the first transmit enable buffer 349 is disabled when the first transmit signal TXI is low (dominant) when the first receive signal RXI falls (recessive to dominant transition).

Thus, the first direction detection flip-flop 321 and associated circuitry serve to determine whether a recessive-to-dominant transition on the first receive signal RXI occurs before a recessive-to-dominant transition on the first transmit signal TXI. When the transition occurs first on the first receive signal RXI, the dominant signal originated on the CAN bus 10. Since the repeater only transmits dominant signals to the single wire link 12 when the dominant signal originated on the CAN bus 10, the repeater prevents a closed-loop lock that could otherwise occur.

The second transmit enable module 390 (FIG. 3B) is similar to the first transmit enable module 340 (FIG. 3A) and the second direction detection module 370 is similar to the direction detection module 320. However the second transmit enable module 390 and the second direction detection module 370 are coupled to the second CAN transceiver 365 whereas the first transmit enable module 340 and the first direction detection module 320 are coupled to the first CAN transceiver 315.

Figure 4:
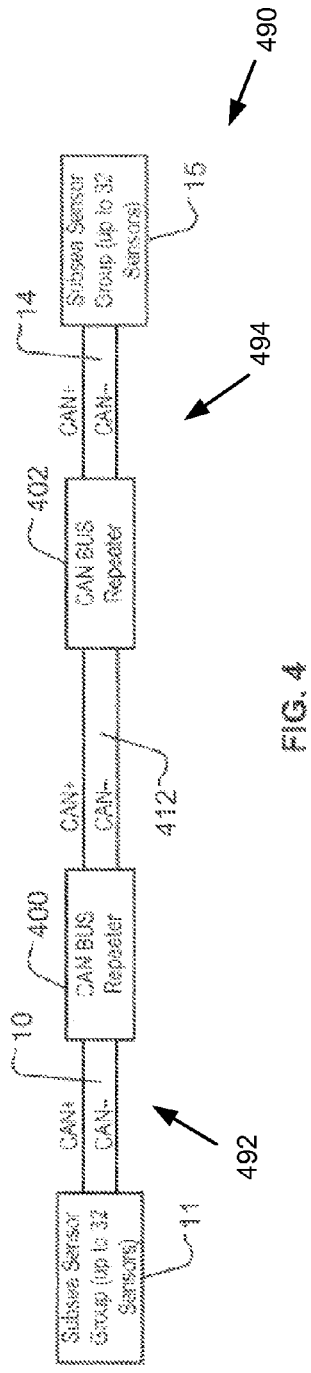
FIG. 4 is a block diagram of a controller area network that includes a communication link using a twisted pair.

FIG. 4 is a second exemplary block diagram of a controller area network 490 that includes first and second bus groups 492, 494 and a communication link 412 using a twisted pair. The controller area network 490 is similar to the network of FIG. 1. However, the controller area network 490 of FIG. 4 uses a twisted pair for the inter-bus link 412. The repeaters 100,102 accordingly include drivers and receivers appropriate for a twisted pair link. To allow transmission over long distances, the drivers and receivers coupled to the twisted pair link may be high-speed CAN bus circuits. These circuits use low voltage signaling.

Figure 5:
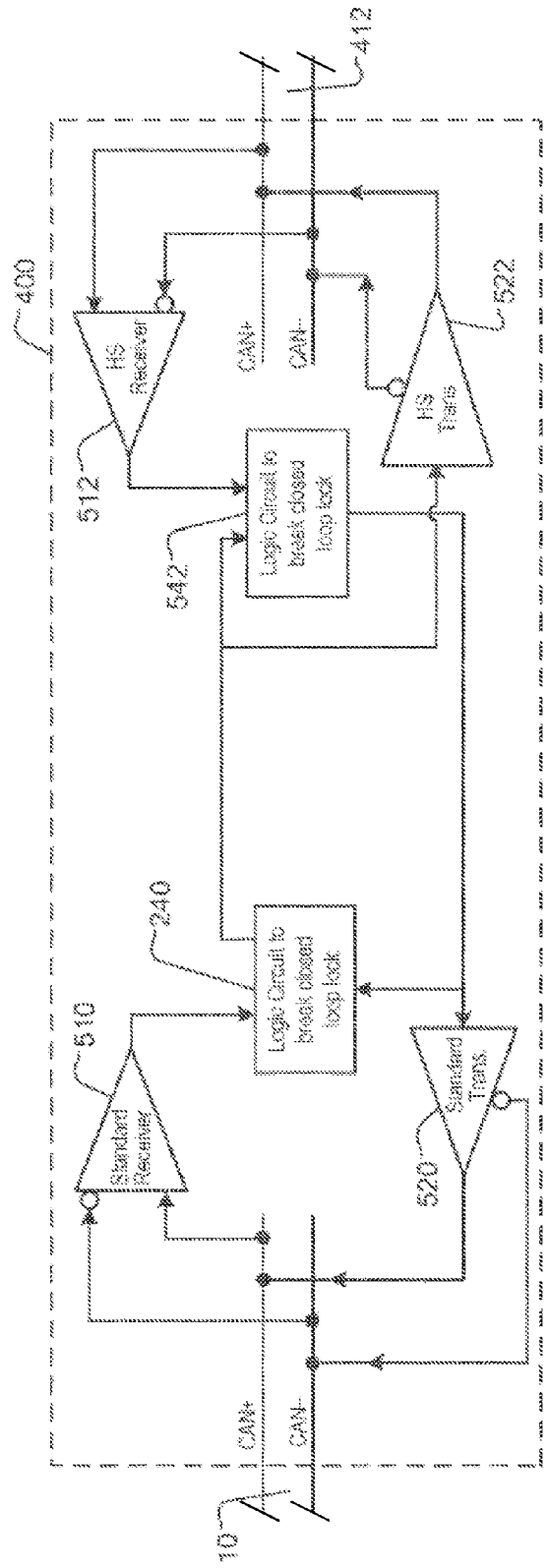
FIG. 5 is a block diagram of a repeater that can be used in the controller area network of FIG. 4.

FIG. 5 is a block diagram of a repeater 100 that can be used in the controller area network 490 of FIG. 4. The repeater 400 is similar to the repeater 100 of FIG. 2. However, the repeater of FIG. 5 uses a standard CAN receiver 510 and a standard CAN transmitter 520 to couple to the CAN bus 10 and a high-speed CAN receiver 512 and a high-speed CAN transmitter 522 to couple to the interbus link 412.

The standard CAN receiver 510 and the standard CAN transmitter 520 allow the CAN bus 10 to be a standard CAN bus that is commonly used with subsea sensors. The high-speed CAN receiver 512 and the high-speed CAN transmitter 522 provide low-voltage signaling and allow the inter-bus link 412 to communicate over long distances, for example.

Figure 6A:
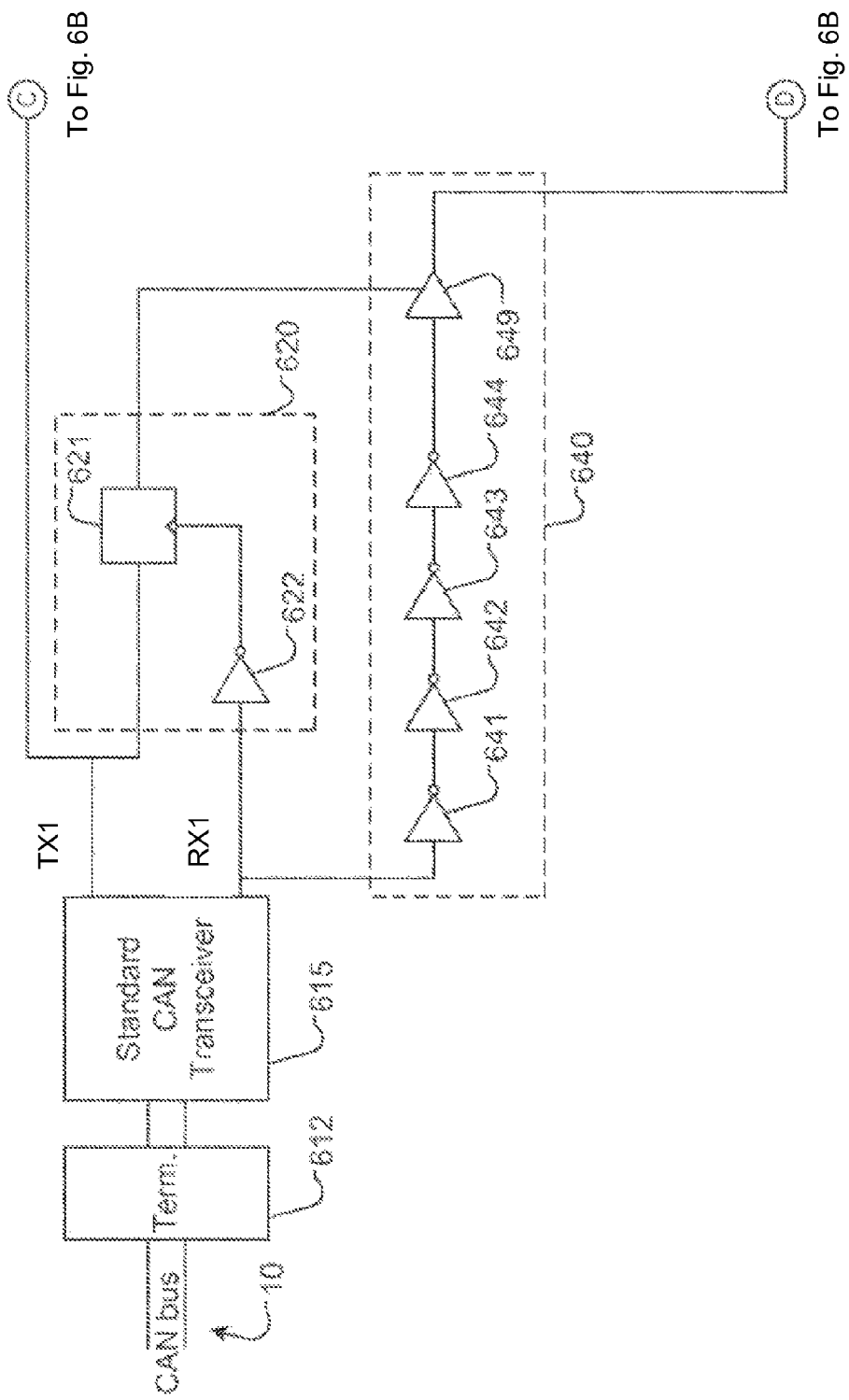
FIG. 6A is a block diagram illustrating further aspects of the repeater of FIG. 5.
Figure 6B:
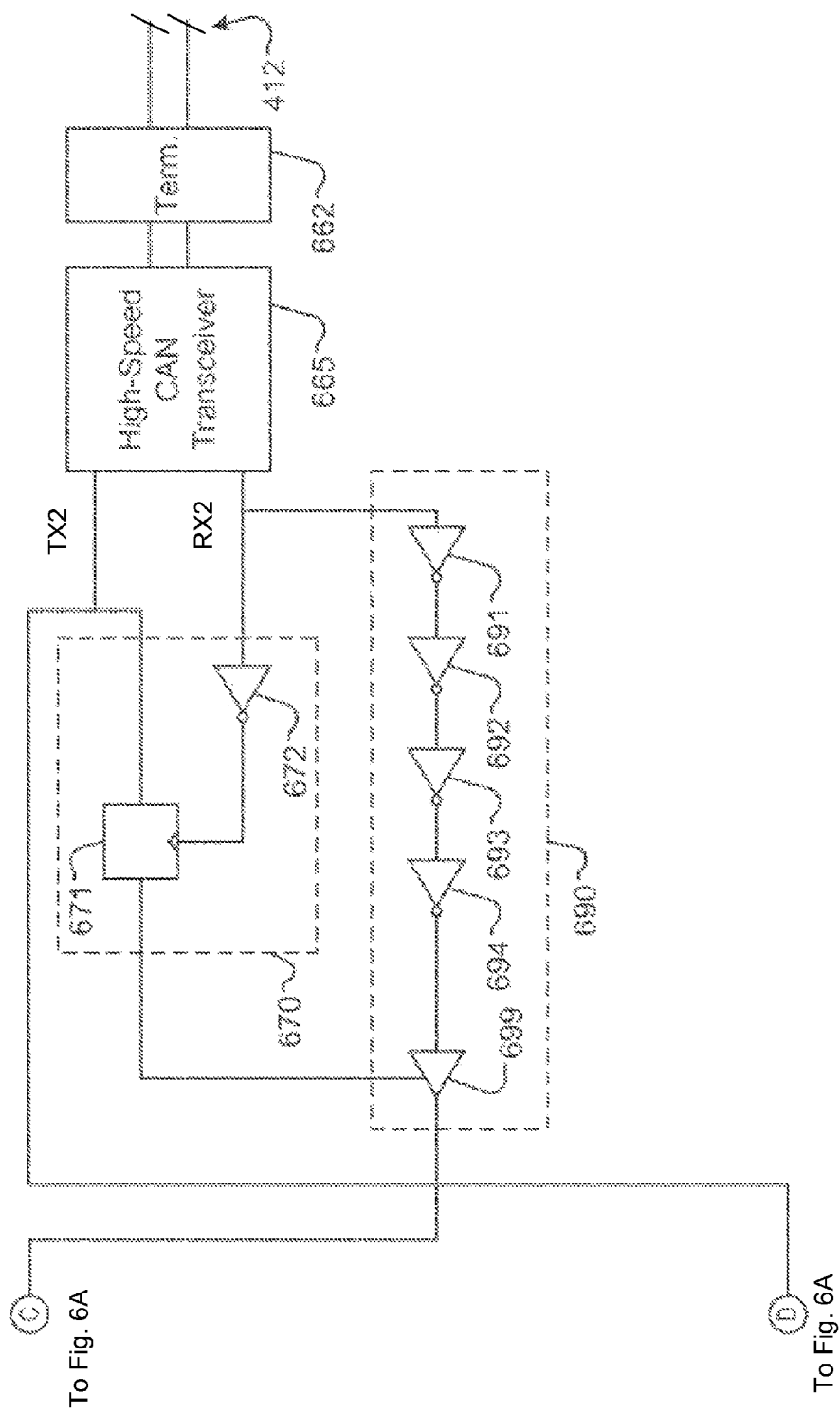
FIG. 6B is a block diagram illustrating further aspects of the repeater of FIG. 5

FIGS. 6A and 6B are block diagrams illustrating further aspects of the repeater 400 of FIG. 5. The repeater is similar to the repeater of FIG. 3A/B. However, the repeater of FIG. 6A/B uses a standard CAN transceiver 615 to couple to the CAN bus 10 and a high-speed transceiver 665 to couple to the inter-bus link 412. The high-speed transceiver 665 may be, for example, a SN65HVD1040 from Texas Instruments.

Those of ordinary skill in the art will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative blocks and modules described m connection with the embodiments disclosed herein can be implemented in or with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A system for coupling controller area network (CAN) buses via a twisted pair wire cable within a transmission line to extend the communication range of CAN buses, the system comprising:
   a first repeater device comprising:
      a standard CAN transceiver coupled to a CAN bus, configured to sense levels on the CAN bus and supply a first receive signal indicating the sensed levels, and configured to receive a first transmit signal and drive a corresponding level on the first CAN bus;
      a high speed CAN transceiver coupled to an inter-bus twisted pair, configured to supply a second receive signal that signals the level on the inter-bus twisted pair, and configured to receive a second transmit signal and drive a corresponding level on the inter-bus twisted pair, the high speed CAN transceiver configured to provide low differential voltage signaling via the inter-bus twisted pair; and
      logic circuitry coupled to the standard CAN transceiver and the high speed CAN transceiver and configured to break closed lock loop between the standard CAN transceiver and the high speed CAN transceiver; and
   a second repeater device connected to the first repeater device via the inter-bus twisted pair and connected to a second CAN bus, whereby the first and second repeater devices connected via the inter-bus twisted pair using low differential voltage provide faster signal transition, wherein the inter-bus twisted pair link interconnects the high speed CAN transceiver of the first repeater device with a high speed CAN transceiver of the second repeater device, the second repeater device being connected to the second CAN bus, wherein both the high speed CAN bus transceivers of the first and second repeater devices use low differential voltage for communicating on the inter-bus twisted pair to substantially decrease signal transition time and enable extended signal transmission range.

2. The system of claim 1, wherein the low differential voltage is less than 2 volts.

3. The system of claim 1, wherein
   the standard CAN transceiver communicates over the CAN bus using a differential voltage of about 8 volts and a data rate of about 50 Hz.

4. The system of claim 1, wherein on receive and transmit signals a low level corresponds to a logic 0 or dominant level and a high level corresponds to a logic 1 or recessive level.

5. The system of claim 1, wherein wherein the standard CAN transceiver upon detecting a persistent dominant state disables driving the CAN bus.

6. A repeater device for providing controller area network (CAN) bus communication over a twisted pair wire cable to extend the communication range of controller area network (CAN) buses, the repeater device comprising:
- a standard CAN transceiver coupled to a CAN bus, configured to sense levels on the CAN bus and supply a first receive signal indicating the sensed levels, and configured to receive a first transmit signal and drive a corresponding level on the CAN bus;
- a high speed CAN transceiver coupled to a twisted pair, configured to supply a second receive signal that signals the level on the twisted pair, and configured to receive a second transmit signal and drive a corresponding level on the twisted pair, the high speed CAN transceiver configured to provide low-voltage signaling via the twisted pair; and
- logic circuitry coupled to the standard CAN transceiver and the high speed CAN transceiver and configured to break closed lock loop between the standard CAN transceiver and the high speed CAN transceiver;

wherein an inter-bus twisted pair link interconnects the high speed CAN transceiver of the repeater device with a high speed CAN transceiver of a second repeater device, the second repeater device being connected to a second CAN bus, wherein both the high speed CAN bus transceivers of the repeater device and the second repeater device use low differential voltage for communicating on the inter-bus twisted pair to substantially decrease signal transition time and enable extended signal transmission range.

7. The repeater device of claim 6, wherein the low differential voltage is less than 2 volts.

8. The repeater device of claim 6, wherein the standard CAN transceiver communicates over the CAN bus using a differential voltage of about 8 volts and a data rate of about 50 Hz.

9. The repeater device of claim 6, wherein on receive and transmit signals a low level corresponds to a logic 0 or dominant level and a high level corresponds to a logic 1 or recessive level.

10. The repeater device of claim 6, wherein the first CAN transceiver upon detecting a persistent dominant state disables driving the first CAN bus.

\* \* \* \* \*